(No Model.)

O. WILSON.
VEHICLE SPRING.

No. 566,434. Patented Aug. 25, 1896.

Witnesses.
Lewis W. Ford
Jessie F. Dean

Inventor.
Odell Wilson,
By Attorney Geo. W. Tibbitts.

UNITED STATES PATENT OFFICE.

ODELL WILSON, OF ST. LOUIS, MISSOURI.

VEHICLE-SPRING.

SPECIFICATION forming part of Letters Patent No. 566,434, dated August 25, 1896.

Application filed October 23, 1895. Serial No. 566,674. (No model.)

*To all whom it may concern:*

Be it known that I, ODELL WILSON, a citizen of the United States, residing at St. Louis, in the State of Missouri, have invented certain new and useful Improvements in Running-Gear for Wheeled Vehicles, of which the following is a specification.

This invention relates to running-gear for wheeled vehicles; and it consists in the combination, with the springs, axles, or bars, of pneumatic springs or cushions in the form of small wheels in such a manner that the said springs shall receive the shock or jar, thereby relieving the vehicle of the strain and wear, also relieving the rider from the unpleasantness of the shock.

The invention comprises the new constructions and combinations, substantially as hereinafter described, and pointed out in the claim.

Figure 2:
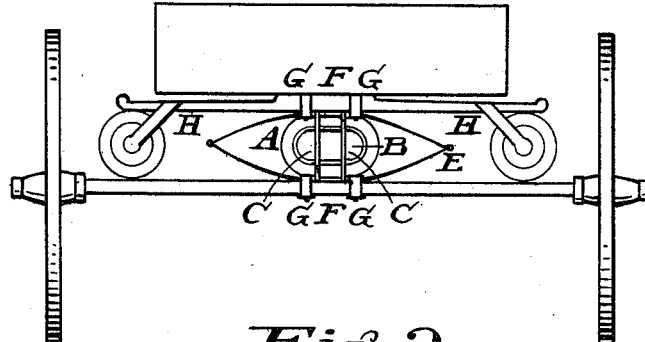
Figure 1:
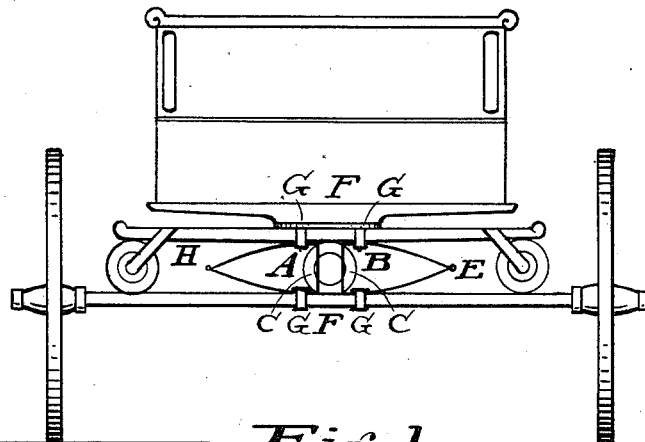
Figure 3:
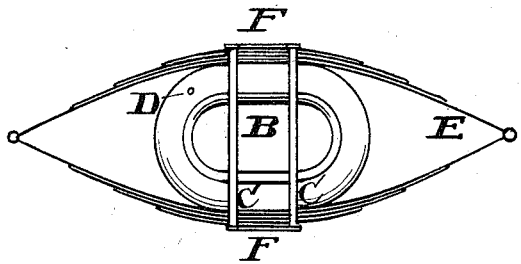
Figure 4:
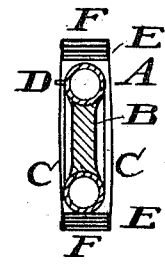

In the accompanying drawings, Figure 1 is a front end elevation of a buggy or wagon having my improvement attached. Fig. 2 is a rear end elevation of the same. Fig. 3 is a side view of an elliptic spring having my pneumatic spring or cushion attached. Fig. 4 is a vertical section of the same.

A in the several figures represents pneumatic wheels or small tires fixed on spools or hubs B. They may be round or oval in form and provided with an inflating-tube and valve D. These pneumatic springs are to be interposed within the metal elliptic springs and secured therein, so that they will act to relieve the metal springs of the strain and shock. C C are flexible spring-guards attached to plates or cross-pieces F F, held between the clips G G, that secure the springs E E to the axles and the cross-bars H H. These pneumatic springs may be placed under the ends of a half-elliptic spring or side or end bars to serve as cushions, for the purpose hereinbefore stated.

Having described my invention, what I claim, and desire to secure by Letters Patent, is—

The combination with the axles, elliptic springs and cross-bars of wheeled vehicles, of the pneumatic springs A, consisting of inflatable rubber tires mounted on hubs B, and the flexible guards C C, adapted to operate in conjunction with the elliptic springs, substantially as and for the purpose set forth.

ODELL WILSON.

Witnesses:
   GEO. W. TIBBITTS,
   C. A. AMY.